United States Patent [19]
Chapin

[11] 3,878,712
[45] Apr. 22, 1975

[54] PRESSURE RECORDATION

[76] Inventor: Ned Chapin, Box 464, Menlo Park, Calif. 94025

[22] Filed: Nov. 5, 1973

[21] Appl. No.: 412,904

[52] U.S. Cl. ................................................ 73/146
[51] Int. Cl. .......................................... G01m 17/02
[58] Field of Search .......................... 73/146, 172

[56] References Cited
UNITED STATES PATENTS

| | | | |
|---|---|---|---|
| 1,849,730 | 3/1932 | Morse | 73/146 |
| 2,051,042 | 8/1936 | Hendel et al. | 73/146 |
| 3,398,397 | 8/1968 | O'Connell | 73/146 |

*Primary Examiner*—Donald O. Woodiel
*Attorney, Agent, or Firm*—C. Michael Zimmerman, Esq.

[57] ABSTRACT

A method and apparatus is described for recording mechanically the pressure applied at differing locations between two surfaces. One described arrangement embodying the invention is for the purpose of determining whether or not an automobile tire is properly inflated. A support plate has a recess in its upper surface between aligned ramps, and a recording slab is positioned within the recess. The recording slab is of a solid foam material which is compressible to a degree proportional to an applied pressure. The pressure of an automobile tire on the recording slab results in the latter being compressed against the bottom of the recess in a manner which is indicative of the inflation of the tire.

12 Claims, 6 Drawing Figures

PATENTED APR 22 1975 3,878,712

PRESSURE RECORDATION

BACKGROUND OF THE INVENTION

The present invention relates to pressure recordation and, more particularly, to a method and apparatus for quickly and simply recording the pressure exerted by one surface on another.

It is often desirable to determine the amount of pressure being applied or exerted by the surface of one member to another. Measurement of such a pressure is now generally obtained by exerting the pressure to be measured on a pressure transducer of one sort or another, whose output is typically an electrical characteristic having a value proportional to the amount of pressure. In general, such systems require an electrical energy source, yield only a transistory measurement, and by altering the pattern of pressure distribution, can yield a measurement that is not representative. Moreover, some potential applications for pressure measurement apparatuses are not being met because such electrical systems are more costly than is warranted by the nature of the application. Furthermore, and perhaps most importantly, the inexpensive pressure measurement devices that are now available do not lend themselves readily to recording or measuring variations at differing locations of the pressure applied between two surfaces.

SUMMARY OF THE INVENTION

The present invention provides both a method and device for mechanically recording pressure which are not only simple in application and inexpensive, but also enable variations in the pressure applied at differing locations between two surfaces to be recorded. In its basic aspects, the method includes the step of positioning between the surfaces exerting pressure on one another, a recording slab of material which is compressible to a degree proportional to an applied pressure within a range of pressures. The amount of the pressure can then easily be determined by measuring the thickness of the compressed portion of the slab of material. It will be recognized that to the extent the applied pressure varies over a compressible surface area, the degree of compression of the material will correspondingly vary at differing locations. Thus, in order to determine the relative difference in pressure at various locations, it is only necessary to measure the thickness of compressed portions of the recording slab at such differing locations to obtain a plurality of measurements indicative of the pressure applied at the respective locations at which such measurements are made.

The apparatus of the invention comprises a lamination of two materials, one being a recording slab of material, e.g., a cellular foam of a solid (as opposed to liquid) plastic material, which is compressible to a degree proportional to an applied pressure, and the other being a base or reference sheet of a material which is generally incompressible when subjected to a pressure within the range of pressures it is expected the device to measure.

If it is desired to retain a record of the pressure, the recording slab of material should be one which is inelastically compressed when subjected to the pressure so that it will retain its degree of compression. An inexpensive and effective material satisfying this requirement is a crushable and open-celled, solid plastic foam, with the open cell grain thereof running in the direction from which it is expected that pressure will be applied to the material. With such an arrangement, the fluid, i.e., the gas or liquid, within the cells of the foam can escape upon such foam being compressed, with the result that the foam better tends to retain its compressed form.

BRIEF DESCRIPTION OF THE DRAWING

With reference to the accompanying single sheet of drawing.

DETAILED DESCRIPTION OF THE PREFERRED EMBODIMENTS

Figures 1, 2, 3, 4, 5, 6:
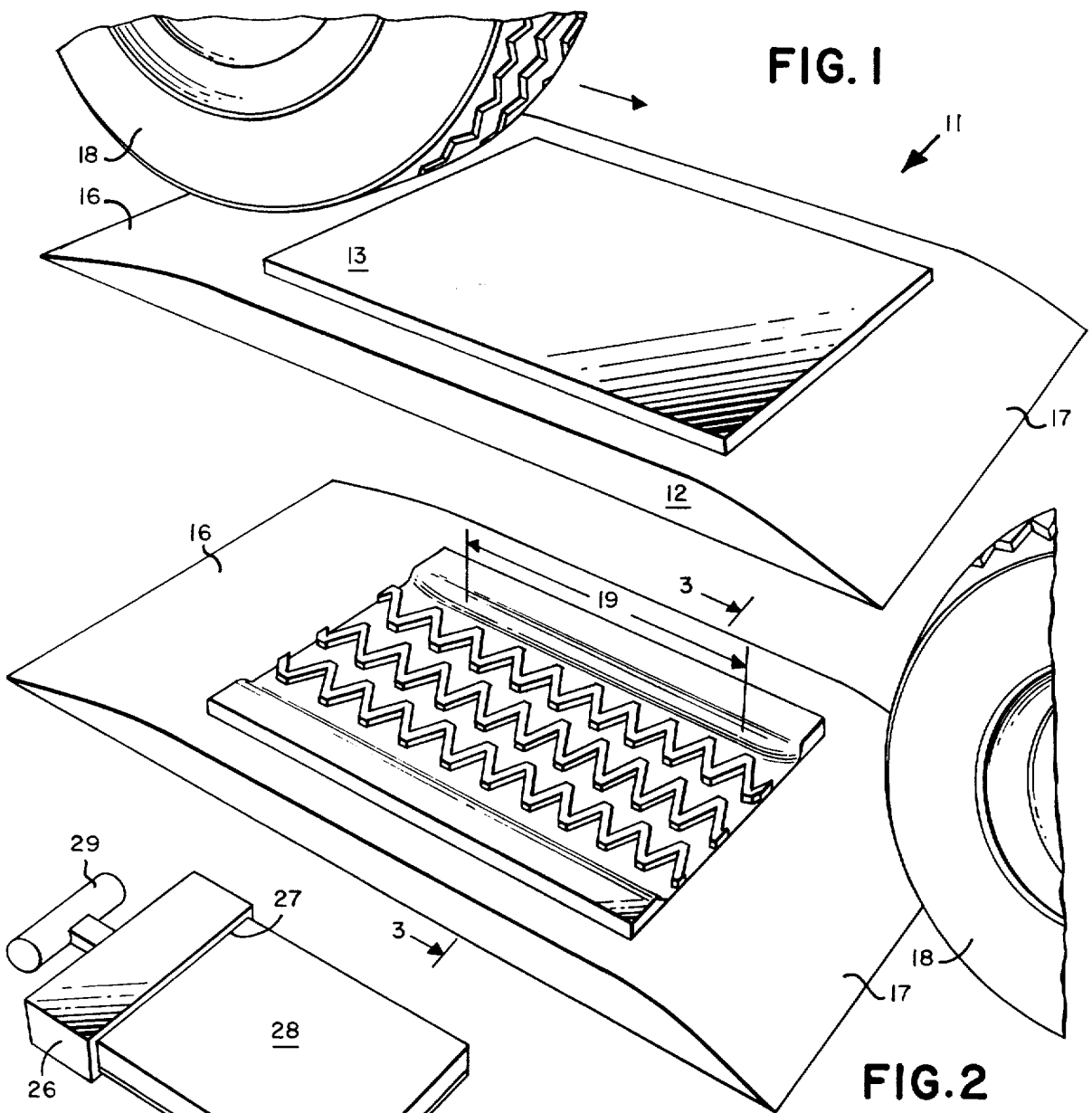
FIG. 1 illustrates a preferred embodiment of the apparatus of the invention which is especially useful for recording variations in the pressure applied by a vehicle tire to a road or other supporting surface.
FIG. 2 is a perspective view similar to FIG. 1 of the preferred embodiment of the invention illustrated in FIG. 1, but showing the same after recordation of the pressure exerted by the vehicle tire.
FIG. 3 is a cross-sectional view of the embodiment of the invention shown in FIG. 2 taken on a plane indicated by the lines 3—3 in FIG. 2, and illustrating the compression and tire impression which is recorded thereby when the vehicle tire is at a proper level of inflation.
FIG. 4 is a cross-sectional view of the recording slab portion of the embodiment of FIG. 1, taken on the same plane as FIG. 3, but illustrating the compression and tire impression which is recorded when the vehicle tire is over-inflated.
FIG. 5 is another cross-sectional view of the recording slab taken on the same plane as FIG. 3 but illustrating the compression and tire impression of an under-inflated tire.
FIG. 6 is another preferred embodiment of the invention capable of more general use than the embodiment of FIGS. 1 through 5.

A salient application of the instant invention is the determination of whether or not an automobile tire is properly inflated. It is known that a properly inflated tire presents a uniform pressure across its width to the road surface. However, an over-inflated tire presents more pressure in the center of the tire than adjacent its edges, whereas an underinflated tire presents more pressure at its edges than at its center. Because the instant invention provides measurements of differential pressure over a surface area, it is especially applicable to checking such tire inflation.

FIGS. 1 through 5 illustrate an embodiment of the invention especially designed for checking the inflation of a vehicle tire. More particularly, the apparatus 11 includes a support 12 for holding a recording slab of material 13. The support 12 is in the form of an elongated plate of an inelastic plastic or the like, having a recess 14 within its upper surface within which the recording slab 13 is received and supported. The support plate further includes aligned "on" and "off" ramps 16 and 17 on opposite sides of the recess 14 to enable travel of a vehicle tire under load, such as the tire illustrated at 18, onto the upper surface of the plate for travel over the recording slab 13 and then off such support plate.

There are various materials which are useful for the recording slab. Slabs of a cellular solid plastic material, such as of an expanded phenolic or urethane resin, have been found to provide quite adequate pressure recordation when included as part of the apparatus, as well as being inexpensive. For a long-lasting recording in this use of the present invention, it is desirable that the foam be inelastic (retain crush resulting from compression) and be of the open or interconnected cell type, with the open cell grain of the slab oriented in the direction from which it is expected that pressure will be applied to such material, i.e., perpendicular to the upper surface of the support plate 12. The result will be that when the foam is compressed by the pressure of a tire or the like thereon, the material of the foam will retain its crush and the fluid in the cells of such foam will be permitted to escape. The foam, therefore, retains its compressed form to provide a long-lasting record of the pressure which has been applied to it. Suitable inelastic foams are those made from the phenolic resin compounds sold under the trademark BAKELITE by the Union Carbide Plastic Co., a division of Union Carbide Corporation of New York, N.Y.

Where short-lived recordings are satisfactory in the use of the present invention, an elastic recording material can be employed, provided that it have a known recovery rate from crush. Of course, those variable factors, e.g., temperature, time of measurement, etc., which will affect the recovery rate of the material must be taken into account. This makes the slabs of pressure recording material reusable. A suitable material for an elastic recording slab is a closed cell, solid plastic foam, such as urethane foam. Such a urethane foam is marketed under the trademark TEMPER FOAM by Dynamic Systems, Inc., of Leicester, N.C.

The range of pressures to which any particular foam is responsive by compression is dependent upon both its type and its density. As is commonly known, such density can be controlled during the manufacture thereof, and most manufacturers provide data on the compression that its foams of particular densities will withstand. For the purposes of the instant invention, it will be appreciated that the foam chosen for any particular application will be one which will compress over the expected range of pressures. For recordation of the inflation of the tires of passenger vehicles, a solid, cellular foam of a phenolic resin having a density of about 2.2 pounds per cubic foot is preferred.

The dimensions of the recording slab of material are also often of importance, depending upon its material and the desired application, to adequately record pressures within a desired range. The recording is most accurately interpretable in absolute pressure terms when the amount of crushdown of the slab under pressure is within the most linear range of the response of the material to pressure. For example, for most uses and materials, including the checking of tire inflation, it is desirable that the crushdown be more than about 20 percent of the original thickness of the slab, but not exceed about 75 percent of the original thickness, for the range of pressure expected. Stated in terms defining the original thickness of the slab, such original thickness is desirably, relative to the range of pressures it is designed to measure, at least about five times the thickness reduction expected when the recording slab is subjected to the minimum pressure within such range, and at least about 1 ⅓ times the thickness reduction expected when the recording slab is subjected to the maximum pressure within the range.

Moreover, to assure that edge effects do not interfere with the accuracy and representativeness of the recording, the recording slab of material should have adequate dimensions in the directions transverse to the direction to which it is expected that pressure will be applied, i.e., the length and width directions. To this end, the length, width and shape should be at least as large as the smaller of the contact areas between the two surfaces. Thus, the minimum length and width of the recording slab shown in FIG. 1 is that needed to accommodate fully the normal "footprint" of the loaded tire for which a pressure reading is desired. If the pressure of the tire is to be recorded with the tire in motion, then the length between the ramps 16 and 17 of such a recording slab of material must additionally be sufficient in the direction of travel of the tire to obtain an area of equilibrium compression. That is, such dimension must be sufficiently long to enable the measurement to be made between the end portions of the material, since near the ends, the compression is affected by the tire "falling into" and "climbing out of" the material. The specific length which is suitable depends upon the pressure, the material, the speed with which the tire is to roll over the material and the radius of the wheel including the tire. As a practical matter, the needed length is usually not less than the distance of the center of the wheel hub (unloaded) from the roadway. When the length is adequate, the result is an area of approximately flat compression as represented at 19 in FIG. 2.

In certain uses to which the method and apparatus of the invention are placed, it is important that the apparatus include a reference or base sheet of material which is generally incompressible when subjected to the expected pressure, which base sheet forms a lamination with the recording slab of material. The purpose of such reference sheet is to provide a uniform reference from which to measure the compression of the recording slab at different locations. Insofar as the tire inflation determining embodiment being described is concerned, the bottom wall 21 (FIG. 3) of the support holder provides the reference base, and is formed from a material which is inflexible and incompressible relative to the pressure which is expected to be applied thereto. Because it is desired to obtain a measurement of the inflation of the tire relative to a flat road surface, the upper surface of the bottom wall 21 is made flat.

From the above, the manner of using the embodiment of FIGS. 1 through 5 for determining the state of a tire's inflation is easily understood. The recording slab is first inserted into the recess 14 of the support holder 12. The resulting structure is then placed where the loaded vehicle tire can be lowered onto it, or where the vehicle tire can be driven or rolled over the same to provide an impression as illustrated in FIG. 2. In this connection, it should be noted from FIG. 3 that the side edges of the holder recess provide support for the material to prevent the same from transversly moving outward and away from the compressive force. This assures that the full pressure applied by the vehicle tire is represented as compression of the material.

The thickness of the compressed portion of the recording slab can be measured at different locations in various ways. For one, the slab can be sectioned along any plane in the area 19 as exemplified by the lines 3—3 in FIG. 2 to thereby expose the cross-section and enable measurement at, for example, the center of the section and adjacent each of the edges of the compressed portion. Comparison of such measurements will then indicate the state of the tire inflation. When the slab is fitted within a recess as shown, the slab itself can be provided in two separable portions with the line of demarcation between the two being along the desired line of pressure measurement. Then after compression, it is merely necessary to separate the two portions to expose a cross-section of the pressure measurement. Another way of obtaining such measurements is by taking core samples of the compressed material at the desired locations with a suitable core tool, and then measuring the depth of the holes or the length of such core samples and, hence, the depth of the compressed material at such locations. If units of pressure are desired, rather than merely a pressure comparison, a graph or conversion table empirically prepared beforehand for the particular recording material being used can be consulted to translate the thickness measurement into units of pressure.

FIGS. 3 through 5 illustrate the compressions resulting from properly inflated, overly-inflated and under-inflated tires, respectively. More particularly, a properly inflated tire will apply generally a uniform pressure to the material over the full width of the tread, whereas an over-inflated tire will provide more pressure to the material under the center of the tread than under the edges of the tread, and an under-inflated tire will apply more pressure to the material under the edges of the tread than under the tread center. Such differential pressure will be reflected as shown by correspondingly differing degrees of compression of the material.

FIG. 6 illustrates another embodiment of the apparatus of the invention of more general use than the embodiment of FIGS. 1 through 5. The support of the device of FIG. 6 is in the form of a receptacle 26 delineating a slot 27 which receives and supports one end of a recording slab 28. Receptacle 26 further includes a handle 29 extending therefrom for facilitating manipulation and holding of the device in position for recording applied pressure by the recording slab.

The reference or base sheet of material in this embodiment is in the form of a thin, incompressible but inelastically flexible sheet 31 which is adhered by a suitable adhesive to the bottom surface of the recording slab 28. When the recording slab is of a rigid foam material, such base sheet 31 functions to hold the same together and prevent crumbling, as well as to provide a uniform reference from which measurements of compression are to be taken.

It will be appreciated that because the supporting receptacle 26 encompasses only one end of the lamination made up by the recording slab 28 and base sheet 31, this embodiment of the invention is quite versatile. That is, it is not necessary that any portion of the support for the lamination be inserted between surfaces before their relative pressure with respect to one another can be measured. In this connection, although the recording slab is illustrated in a rectangular configuration, other configurations can also be used, depending upon the needed access and size and configuration of a surface area between which the recording slab is to be inserted. Moreover, although the reference sheet 31 is adhered to the bottom surface of the recording slab in this embodiment, it could as well be adhered to the recording slab top surface.

Insofar as the method of the instant invention is concerned, it includes obtaining a desired pressure record by holding, manually or otherwise, a recording slab of material as defined above between the surfaces exerting the pressure to be recorded between one another. Although for many uses a reference sheet is preferably included as described above, this is not always necessary, depending on the nature of the recording slab and the configuration of the two surfaces which exert the pressure. The pressure is determinable by then measuring the thickness of the compressed portion of the slab. As mentioned before, both the method and apparatus of the invention are especially useful for recording and measuring pressures which are variable over a surface area. To obtain either absolute or relative measurements of an exerted pressure which varies over a surface area, it is only necessary to measure the thickness of the compressed portion of the recording slab at the differing locations at which it is desired to know the pressure. The relative pressures are then easily ascertained by comparing the measurements, and the absolute pressures are obtained with reference to a conversion table as discussed earlier.

Although the invention has been described in connection with preferred embodiments thereof, it will be appreciated by those skilled in the art that various changes and modifications can be made without departing from its scope. For example, while the recording slabs of the preferred embodiments are described as cellular foams of solid plastic materials, there are other materials which are compressible to a degree proportional to an applied pressure. For example, the various honeycomb materials often used for high-strength, low-weight wall applications, tend to crush in a direction perpendicular to the axis of the honeycomb cells to a degree proportional to an applied pressure. Such materials are, therefore, useful as a recording slab for certain applications, especially those applications in which the pressure expected to be measured is relatively high. It is, therefore, intended that the coverage afforded applicant be limited only by the language of the claims and its equivalent.

That which is claimed is:

1. A device for recording within a range of pressures, the pressure exerted by one surface relative to another; said device comprising a reference sheet of material which is generally incompressible when subjected to pressure within said range of pressures, and a recording slab of a material which is compressible to a degree proportional to the applied pressure when it is subjected to pressure within said range of pressures, said slab and reference sheet forming a lamination which is insertable between said two surfaces for compression of said slab against said reference sheet to record said pressure by the degree of said compression, and said recording slab being of a material which is inelastically compressed when subjected to pressure within said range of pressures to thereby retain a record of the applied pressure.

2. The device of claim 1 for recording pressure wherein the material of said slab is an open celled foam of a solid material with the open cell grain thereof oriented in the direction from which it is expected that pressure will be applied to such material, whereby escape of fluid from the cells of said foam is permitted upon compression thereof.

3. The device of claim 1 for recording pressures wherein said recording slab has a thickness in the direction from which it is expected that pressure will be applied, which is at least about five times the thickness reduction expected when said recording slab is subjected to the minimum pressure within said range of pressures, and at least about 1 ⅓ times the thickness reduction expected when said recording slab is subjected to the maximum pressure within said range of pressures.

4. The device of claim 3 wherein said recording slab has dimensions in directions transverse to the direction from which it is expected that pressure will be applied which is equal to or greater than the dimensions in such directions of the smaller of the surface areas contacting such slab and applying pressure thereto.

5. The device of claim 1 for recording pressure further including a support for holding said recording slab.

6. The device of claim 5 especially adapted to record variations in the applied pressure along the width of a vehicle tire, said support being a plate having a recess in its upper surface for receipt and support of said recording slab, and further including aligned ramps on opposite sides of said recess for travel of a vehicle tire onto and off of the upper surface thereof.

7. The device of claim 6 wherein said material of said recording slab is a solid cellular foam of a phenolic resin having a density of about 2.2 pounds per square foot with the open cell grain thereof oriented in the direction from which it is expected that pressure from a vehicle tire will be applied thereto, whereby escape of the fluid from the cells of said foam is permitted upon compression thereof so that said foam will be inelastically compressed to retain a record of the applied pressure.

8. The device of claim 6 for recording pressure wherein said recording slab has a width and length equal to or greater than the smaller of the surface areas contacting such slab and applying pressure thereto.

9. The device of claim 5 for recording pressure wherein said support includes a receptacle for receiving and supporting said recording slab, and a handle extending from said receptacle for facilitating manipulation of said device into position for recording a pressure.

10. A method of recording a pressure within a range of pressures exerted by one surface relative to another comprising the steps of: holding between said surfaces during application of said pressure, a recording slab of a material which is compressible to a degree proportional to an applied pressure within said range of pressures; and measuring the thickness of the compressed portion of said slab after compression thereof by said applied pressure to obtain an indication of the degree of said compression and, hence, the amount of said pressure.

11. A method of recording a pressure within a range of pressures exerted by one surface relative to another comprising the step of holding between said surfaces during application of said pressure, a recording slab of a material which is compressible to a degree proportional to an applied pressure within said range of pressures, said recording slab being an open-celled foam of a solid material, with the open cell grain thereof oriented in the direction from which pressure is applied to said material when it is positioned between said surfaces, whereby escape of fluid from the cells of said foam is permitted upon compression thereo.

12. A method of recording a pressure within a range of pressures exerted by one surface relative to another wherein the pressure to be measured is a pressure which is variable over the area of the surface subjected thereto, comprising the steps of: holding between said surfaces during application of said pressure, a recording slab of a material which is compressible to a degree proportional to an applied pressure within said range of pressures; and measuring the thickness of the compressed portion of said recording slab at differing locations after it has been compressed between said members to obtain a plurality of measurements respectively indicative of the pressures applied at the individual locations at which such measurements are made.

* * * * *